Nov. 18, 1969     W. H. PEDERSON     3,478,606
APPARATUS FOR INDICATING THE RELATIVE MOVEMENT OF A SNOWMOBILE
Filed Dec. 19, 1967                    2 Sheets-Sheet 1

INVENTOR
WALTER H. PEDERSON

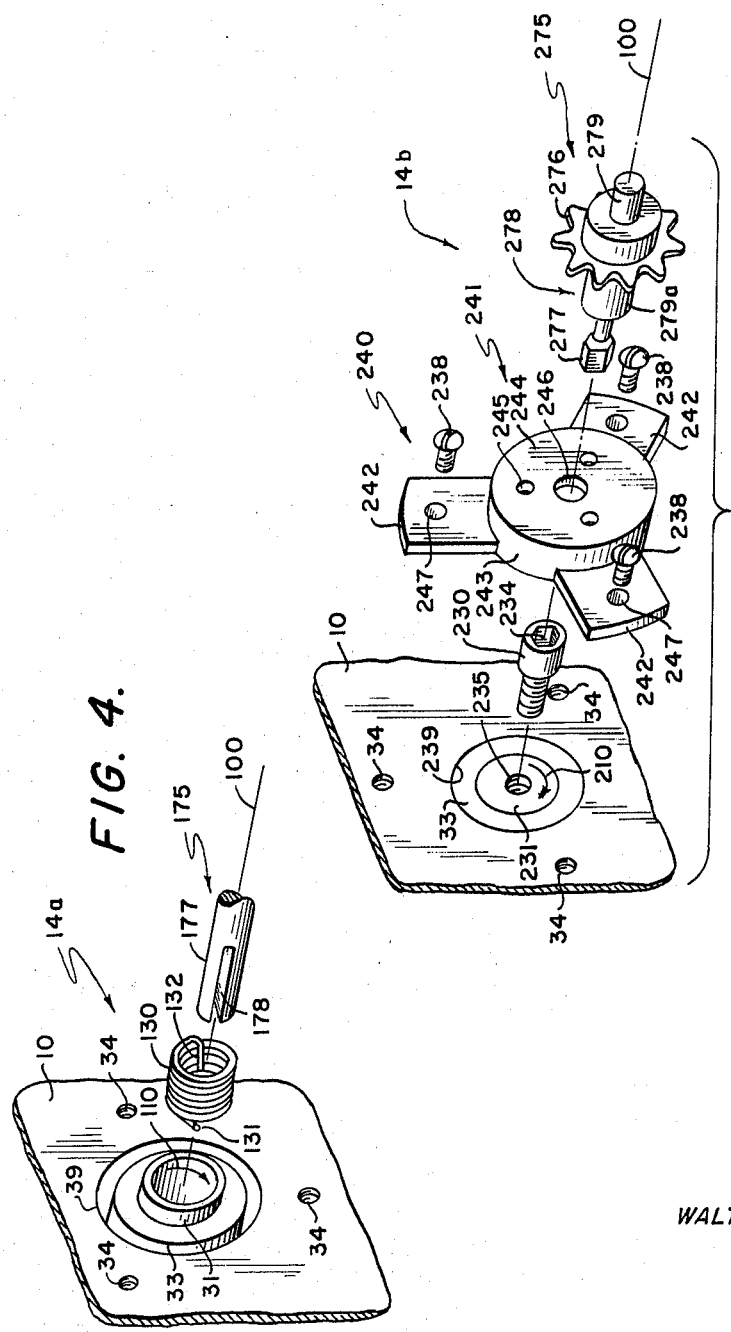

United States Patent Office 3,478,606
Patented Nov. 18, 1969

3,478,606
APPARATUS FOR INDICATING THE RELATIVE MOVEMENT OF A SNOWMOBILE
Walter H. Pederson, Rte. 1, St. Cloud, Minn. 56301
Filed Dec. 19, 1967, Ser. No. 691,789
Int. Cl. F16h 7/00, 37/00
U.S. Cl. 74—12                                  7 Claims

ABSTRACT OF THE DISCLOSURE

Apparatus for indicating the relative movement of a snowmobile and more particularly to a velocity and distance indicator. A drive shaft adaptor is connected to a drive shaft of the snowmobile and a motion transfer housing is operatively connected to said adaptor. A rotational velocity adjustment means, within the transfer housing, provides selective velocity variation of the transferred rotational motion. A cable transfers the rotational motion from the transfer housing to an indicating head for ultimate indication of the present velocity of a snowmobile and the distance traveled by a snowmobile.

Background and summary of the invention

In the utilization of an endless track motor vehicle by hunters, prospectors, sportsmen, army personnel and the like, remote serene roadless areas are readily reachable. It is imperative, when venturing into and through such solitude areas the commonly reach subzero temperatures, that the endless track motor vehicle or snowmobile provide the riders with a maximum amount of safety. It is in this setting that a small degree of safety can be life saving.

When the rider of such a vehicle is traveling in such a wilderness area whether hunting, exploring or for whatever reason, it concerns his personal safety not to get lost. An adequate map is a basic safety factor, however, in locating one's current position it becomes necessary to know from where one started, the general direction of travel and the distance traveled. The third factor concerns this invention, i.e., measuring the distance traveled during the present excursion. Prior distance measuring devices have not been able to withstand the extreme conditions imposed upon them by the operators of such vehicles. The distance measuring device of the present invention, because of its unique and rugged design, fulfills this long felt want and without in any way impairing the operation of the snowmobile and without impairing the safety of the riders.

The velocity at which one is traveling while riding such a vehicle becomes a significant safety factor in a multitude of situations. Moreover, the human mind of the rider is not always capable to adequately ascertain the actual relative velocities. For example, when traveling across a large open area such as a frozen-over lake, the apparent velocity will be lower than the actual true velocity. Thus one is traveling faster than is realized. A frozen-over lake may contain many dangers such as relatively thin ice caused by an underlying water spring, or open water caused by shifting ice, or ice pressure-ridges caused by the shifting ice. To avoid such dangers a maximum safe speed can be ascertained under the current conditions by determining, in general, how quickly one can stop to avoid the danger after first sighting the danger and then maintaining a velocity below this maximum safe speed. The velocity measuring device of the present invention has solved the workability of such an accurate and sensitive mechanism used in such a hostile environment to fulfill the long felt want for such a device.

The present invention, therefore, relates to an apparatus for indicating the relative movement of a snowmobile and thereby provide additional safety to the riders of such vehicles. Also, the present invention, because of its unique and rugged design, has been successfully adapted to and utilized on three snowmobiles on a recent Artic expedition to follow Commodore Peary's overland route to the North Pole.

The general object of the present invention is to provide a means for additionally safeguarding the riders of snowmobiles during the utilization of such vehicles.

It is another obect of the present inventijon to provide an apparatus that may be readily adapted to various snowmobiles.

It is still another object of the present invention to provide an apparatus that may be readily modified to selectively vary the outgoing rotational velocity from the transfer housing.

Brief description of the drawing

Other objects and many of the attandant advantages of this invention will be readily appreciated as the same becomes better understood by reference to the following detailed description when considered in connection with the accompanying drawings in which like references numerals designate like parts throughout the figures thereof and wherein:

FIG. 4 illustrates an exploded perspective view of a portion of the motion transfer assembly of the second embodiment of the invention; and FIG. 5 illustrates an exploded perspective view of a portion of the motion transfer assembly of the third embodiment of the invention.

Description of the embodiments

Figure 1:
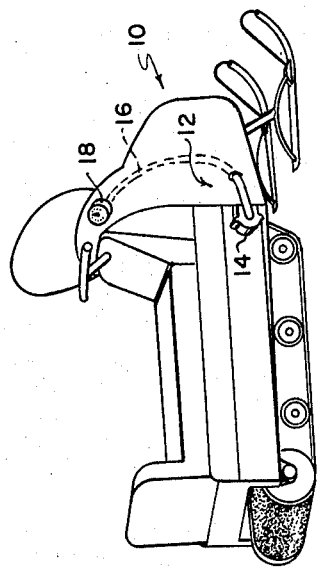
FIG. 1 illustrates a side perspective view of the entire invention.

Referring now to the drawings, wherein like reference characters designate like or corresponding parts throughout the several views, there is shown in FIG. 1 a snowmobile 10 and an indicator assembly 12. The indicator assembly comprises a motion transfer assembly 14, a motion transmitting cable 16 and an indicating head 18. The head 18, which may be one of several known types for indicating velocity and distance traveled, is fixedly mounted on the dash of the snowmobile 10. The cable 16 is attached to the head 18 and threadedly attached to the threaded post 91, of the transfer assembly 14, by a retaining nut (not shown), to operatively engage the driven sprocket assembly 80 and thereby transmit the rotational motion from the driven sprocket assembly 80 to the head 18.

Figure 2:
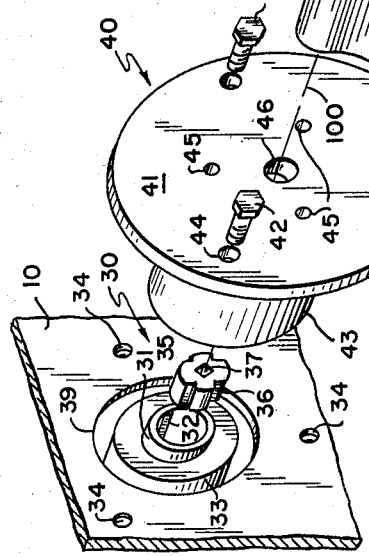
FIG. 2 illustrates an exploded perspective view, partly in section, of the motion transfer assembly of the invention.

The motion transfer assembly 14, as shown in the exploded perspective view of FIG. 2, comprises a longitudinal axis 100, a drive shaft adaptor 30, a mounting adaptor assembly 40, a motion transfer housing 50, a rotational velocity adjustment means 70, and a cover plate 90. It is to be noted that the assembly 14 may be mounted on the right-hand or left-hand side of the snowmobile.

The snowmobile 10 includes an aperture 39 in the sideframe of the snowmobile, a hollow drive shaft 31, having an axis coaxial with axis 100 and an inwardly projecting weld seam 32 within the drive shaft 31, a bearing 33 to support the drive shaft 31, and three threaded apertures 34 to receive the three cap-screws 42.

The drive shaft adaptor 30, being composed of a resilient material, such as nylon or the like, comprises an outer circumferential peripheral surface 35, four longitudinal grooves 36, and a centrally located longitudinally extending square aperture 37 coaxially aligned with axis 100. The drive shaft adaptor 30 has a generally longitudinal wedge shape, i.e., the outer diameter of the adaptor 30 is greater at one end than at the other end to thus form a truncated cone. The smaller diametrical end of the adaptor 30 is slightly smaller than the inner diameter of the drive shaft 31 whereas the larger diametrical end of the adaptor 30 is slightly larger than the inner diameter of the drive shaft 31. Thus, to insert the adaptor 30 into the shaft 31, a longitudinal groove 36 is firstly aligned with the weld seam 32. Then the smaller diametrical end of the adaptor 30 is inserted into the shaft 31. The adaptor 30 is then further pressed into the shaft 31, compressing the adaptor 30 to provide a swage-fit between the adaptor 30 and the shaft 31. Thus, the interference fit will minimize longitudinal and rotational movement of the adaptor 30 relative to the shaft 31. The weld seam 32, in engagement with a groove 36, will further minimize rotational movement between the adaptor 30 and the shaft 31.

The mounting adaptor assembly 40 comprises a generally flat flange plate 41 and a cylindrical tubular bearing retainer 43 welded (the weld bead is not shown) or otherwise connected to the plate 41. The tubular bearing retainer 43 has an outer diametrical dimension which is slightly less than the diametrical dimension of the aperture 39 whereas the inner diameter of the bearing retainer 43 is slightly greater than the outer diameter of the bearing 33. The generally flat plate 41 is provided with outer clearance aperture 44 aligned with the three threaded aperture 34, three inner clearance aperture 45 aligned with the three threaded holes 51 in the housing 50, and a center clearance aperture 46 coaxially aligned with the axis 100. Thus, the bearing retainer 43 is positioned over the bearing 33, the cap-screws 42 are inserted through the aperture 44 and into the threaded aperture 34 to securely connect the mounting adaptor assembly 40 to the side frame of the snowmobile.

The motion transfer housing 50 comprises a cavity 52 to house the rotational velocity adjustment means 70, a back wall 54, three threaded holes 51 in longitudinal axial alignment with the apertures 45, an aperture (not shown) coaxially aligned with the longitudinal axis 100 to provide a bearing means for the shaft 78, and four threaded holes 56 for securing the cover 90 to the motion transfer housing 50. The housing 50, being composed of a metallic substance, such as aluminum or the like, is illustrated as having been formed by a casting process. However, to assemble such a housing by welding or to construct the housing from a plastic or other synthetic material would be readily apparent from applicant's disclosure.

Figure 3:
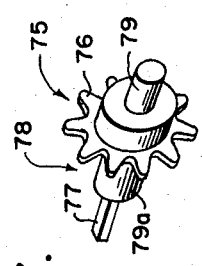
FIG. 3 is a perspective view of the drive sprocket assembly of the invention.

The rotational velocity adjustment means 70 comprises a drive sprocket assembly 75 (FIG. 3), a driven sprocket assembly 80, and a motion transfer chain 85. It is to be understood that the adjustment means 70 may comprise of gears, frictionally engaged wheels, and other equivalent adjustment means. The drive sprocket assembly 75 (FIG. 3) comprises a drive sprocket 76 and a shaft 78. The shaft 78 comprises a square first end portion 77 to fit inside the square aperture 37, a cylindrical second end portion 79, and an intermediate cylindrical portion 79a being of a larger diameter than shaft portion 79 for reasons that will be hereinafter apparent. Thus, the drive sprocket 76 is positioned on the shaft 79 and against the larger diametrical shaft portion 79a, which acts as a positioning means for the drive sprocket 76. The drive sprocket 76 is then secured to the shaft portion 79 by a set screw (not shown). Thus, when the drive sprocket assembly 75 is positioned in the housing 50, the square shaft portion 77 will project beyond the exterior the back wall 54 of the housing 50 for ultimate engagement with the square aperture 37 in the drive shaft adaptor 30. The driven sprocket assembly 80 comprises a driven sprocket 81 and a shaft 82. The shaft 82 comprises a cylindrical first end portion 83 having a flat portion 84 to engage the motion transmitting cable 16, and an inner cylindrical shaft portion (not shown) which is diametrically larger than the shaft portion 83 to provide positioning means for the sprocket 81. Thus, the driven sprocket 81 is positioned on the shaft portion 83 against the larger inner shaft portion (not shown) and secured to the shaft portion 83 by a set screw (not shown). The physical size selection i.e., the pitch diameter of the drive and driven sprockets is determined by other features of the snowmobile, e.g., the diametrical size of the belt track drive sprocket (not shown) on the drive shaft 31 of the snowmobile. Thus, an advantageous feature of this invention is the physical capability of permitting one to readily install variously sized sprockets within the transfer housing 50 and thereby adjust the relative rotational velocity between the drive and driven sprockets to insure a true velocity and distance indication for the snowmobile 10. Thus, the output rotation velocity from the driven sprocket assembly may be selectively decreased or increased relative to the drive sprocket assembly, and, of course, the selection will depend on various pertinent features of the various snowmobiles.

The cover plate 90 comprises a generally flat portion 92, a hollow threaded post 91 in longitudinal alignment with the driven sprocket assembly 80, a projection 93 having an inner cavity (not shown) in longitudinal alignment with the axis 100 to receive the shaft portion 79 of the drive sprocket assembly 75, and four clearance apertures 94 (three shown). Thus, four cap-screws (not shown) are inserted through the clearance apertures 94 to threadedly engage the threaded holes 56 to secure the cover plate 90 to the housing 50. The removable oil plug 95 permits the subsequential addition of a lubricating oil to the cavity 52.

Thus, the drive shaft adaptor 30 is presesd into the hollow shaft 31, three cap-screws (not shown) are inserted through the clearance apertures 45 and into the threaded holes 51 to secure the adaptor assembly 40 to the housing 50, the squared shaft 77 is aligned with the square aperture 37 and the adaptor assembly 40 is then secured to the snowmobile by the cap-screw 42. It is to be noted that the housing 50 is laterally physically smaller than the distance between the apertures 44 so as not to interfere with the mounting of the adaptor assembly 40 to the snowmobile after the assembly 40 has been secured to the housing 50. The cover plate 90 is then secured to the housing 50 and a lubricating oil is inserted into the housing 50 after removing the oil plug 95. The motion transmitting cable 16 is then secured to the threaded post 91 to engage the flat portion 84 of the shaft 82 and thereby transmit the rotational motion of the driven sprocket 81 to the indicating head 18.

In referring to the second embodiment of the invention, the motion transfer assembly 14a illustrated in FIG. 4, the right hand frame of the snowmobile 10 (as was also illustrated in FIG. 2) includes an aperture 39 in the side-frame of the snowmobile, a hollow drive shaft 31 having a rotational direction 110, a bearing 33, and three threaded apertures 34. The adaptor coil 130, which is of an elastic metallic material, is a left-handedly wound torsional coil in this illustration. The coil 130 has an outer diameter slightly larger than the inner diameter of the hollow shaft 131. Thus, the coil, when inserted into the shaft 31, must necessarily be slightly compressed and thereby provide positive engagement between the outer periphery of the coil and the inner wall of the shaft 31. Moreover, the end 131 of the coil 130 provides positive engagement between the coil 130 and the inner wall of the shaft 31. The coil 130 further comprises a transverse portion 132. The shaft 177, of the drive sprocket assembly 175 (not fully shown) comprises a transverse slot 178 to engage the transverse portion 132 of the coil 130. It is to be understood that the mounting adaptor assembly, the motion transfer housing, the rotational velocity adjustment means, all of the motion transfer assembly 14a, are substantially the same as those illustrated in FIG. 2 and have not been included within FIG. 4 so as to provide clarity and ease in understanding the second embodiment. Thus, after assembling this embodiment, the inner wall of the drive shaft 31 will engage the end 131 and the outer periphery of the coil 130 and thus rotate the coil 130 with the shaft 31. The slotted shaft 177 will exhibit a restraining force, due to frictional energy loss within the indicator assembly, and will thereby tend to cause the coil to unwind which will further increase the engagement between the shaft 31 and the coil 130. It is to be noted that if the shaft 31 had a rotational direction opposite to the indicated direction 110, the the coil 130 would be right-handedly wound. And, if it is desired to mount the indicator assembly 14b on the left-hand side of the snowmobile, the adaptor coil will be selectively wound to provide a similar positive engagement between the drive shaft and the coil 130.

In referring to the third embodiment of this invention, the motion transfer assembly 14b illustrated in FIG. 5, the right hand frame of the snowmobile 10 includes an aperture 239 to retain the bearing 33, three threaded apertures 34, a solid drive shaft 231, and a threaded bore 235. The solid drive shaft 231 has a shown clockwise rotational direction 210. The bore 235 is left-handedly threaded to preclude loosening of the left-handedly threaded drive shaft adaptor 230 from the shaft 231 due to the clockwise rotational direction 210 of the shaft 231. It is to be noted that if the shaft 231 had a counterclockwise rotation, the bore 235 would be right-handedly threaded. Also, if it is desired to mount the indicator assembly 14b on the left-hand side of the snowmobile, assuming the shaft 231 has a rotational direction 210, the bore 235 would then be right-handedly threaded. The drive shaft adaptor 230 further includes a hexagonally shaped socket 234. The mounting adaptor assembly 240 comprises a concave-convex center portion 241 and three equally spaced lugs 242 attached to the center portion 241. The center portion 241 includes a tubular portion 243 and a flat portion 244 having three apertures 245 longitudinally aligned with the threaded apertures 51 in the housing 50 (as shown in FIG. 2) and a center clearance aperture 246 coaxially aligned with the axis 100. The three lugs 242 are provided with three clearance apertures 247 in longitudinal alignment with threaded apertures 34 for securing the adaptor assembly to the snowmobile 10. The drive sprocket assembly 275 comprises a drive sprocket 276 and a shaft 278. The shaft 278 comprises a hexagonally shaped first end 277, to fit within the hexagonal socket 234, a cylindrical second end 279 and an intermediate cylindrical portion 279a which acts as a positioning means for the sprocket 276. The relieved portion of the shaft 278, between the first end 277 and the intermediate portion 279a, provides misalignment clearance between the adaptor 234 and the shaft 278. The drive sprocket 276 is secured to the shaft 279 by a set screw (not shown). The remaining elements of the indicator assembly of this embodiment, which are substantially the same as those shown in FIG. 2 have not been shown in FIG. 5 for reasons of clarity. Thus to assemble the third embodiment the adaptor 230 is threadly inserted into the bore 235, three cap screws (not shown) are inserted through apertures 245 into threaded engagement with the apertures 51 (shown in FIG. 2) to secure the housing 50 (shown in FIG. 2) to the mounting adaptor assembly 240. The hexagonally shaped first end 277 is then inserted into the socket 234 and the three screws 238 are inserted through the apertures 247 and into the threaded apertures 34 to secure the motion transfer assembly 14b to the snowmobile 10.

What is claimed and desired to be secured by Letters Patent of the United States is:

1. An apparatus for indicating the movement of a snowmobile, comprising
    an adaptor means, connected to an operatively driven hollow drive shaft of a snowmobile, for transmitting the rotational motion of the drive shaft, said adaptor means including means to frictionally engage the inner wall of a said hollow drive shaft whereby the rotational motion of the drive shaft will be transmitted to said adaptor means;
    a motion transfer means including
        a drive assembly operatively connected to said adaptor means for receiving said rotational motion of said drive shaft,
        a driver assembly for providing an output rotational motion, and
        means for transmitting rotational motion from said drive assembly to said driver assembly and to afford selective variance of the transmitted output rotational motion of said driver assembly relative to the rotational motion of said drive assembly; and
        means for receiving said output rotational motion from said driver assembly and for indicating the snowmobile's movement.

2. An apparatus for indicating the movement of a snowmobile, as defined by claim 1, wherein:
    said adaptor means further comprises a truncated conically shaped adaptor that is pressed into the driven hollow shaft to thereby minimize any relative motion between said adaptor means and the driven hollow shaft.

3. An apparatus for indicating the movement of a snowmobile, as defined by claim 2, wherein:
    said adaptor means further comprises at least one groove on the outer periphery of said adaptor to operatively engage a projection on the inner wall of the driven hollow shaft to thereby further minimize any relative motion between said adaptor means and the driven hollow shaft.

4. An apparatus for indicating the movement of a snowmobile, as defined by claim 3, wherein:
    said motion transfer means further comprises a rotational velocity adjsutment means;
    said rotational velocity adjustment means further comprises:
        a drive means;
        a driven means; and
        a motion transfer means operatively connected to said drive means and said driven means, whereby the drive means and driven means may be selectively varied to vary the output motion from said motion transfer means.

5. An apparatus for indicating the movement of a snowmobile, as defined by claim 1, wherein:
    said adaptor means further comprises a coil means that is pressed into the driven hollow shaft to thereby minimize any relative motion between said coil means and the driven hollow shaft.

6. An apparatus for indicating the movement of a snowmobile, comprising
    an adaptor means, threadly connected to an operatively driven hollowed end of a drive shaft of a snowmobile, for transmitting the rotational motion of the drive shaft;
    a motion transfer means including
        a drive assembly operatively connected to said adaptor means for receiving said rotational motion of said drive shaft,
        a driver assembly for providing an output rotational motion, and
        means for transmitting rotational motion from said drive assembly to said driver assembly and to afford selective variance of the transmitted output rotational motion of said driver assembly relative to the rotational motion of said drive assembly; and means for receiving said output rotational motion from said driver assembly and for indicating the snowmobile's movement.

7. An apparatus for indicating the movement of a snowmobile, as defined by claim 6, wherein:

said motion transfer means further comprises a rotational velocity adjustment means;

said rotational velocity adjustment means further comprises;

a drive means;

a driven means; and a motion transfer means operatively connected to said drive means and said driven means, whereby the drive means and driven means may be selectively varied to vary the output motion from said motion transfer means.

References Cited

UNITED STATES PATENTS

| | | | |
|---|---|---|---|
| 1,478,372 | 12/1923 | Belden | 74—12 |
| 1,713,272 | 5/1927 | Eason et al. | 74—325 X |
| 1,712,956 | 5/1927 | Gustafson | 74—325 X |
| 2,346,681 | 4/1944 | Harper | 74—325 |
| 2,795,965 | 6/1957 | Hinton | 74—325 X |

LEONARD H. GERIN, Primary Examiner

U.S. Cl. X.R.

74—325; 235—95; 287—126